United States Patent
Delfeld et al.

(10) Patent No.: US 10,568,143 B2
(45) Date of Patent: Feb. 18, 2020

(54) WINDOWED SEQUENCE FOR RANDOM ACCESS METHOD AND APPARATUS

(71) Applicant: Cohere Technologies, Inc., Santa Clara, CA (US)

(72) Inventors: James Delfeld, Santa Clara, CA (US); Ronny Hadani, Santa Clara, CA (US); Konstantinos Dimou, Santa Clara, CA (US)

(73) Assignee: Cohere Technologies, Inc., Santa Clara, CA (US)

(*) Notice: Subject to any disclaimer, the term of this patent is extended or adjusted under 35 U.S.C. 154(b) by 3 days.

(21) Appl. No.: 15/937,701

(22) Filed: Mar. 27, 2018

(65) Prior Publication Data

US 2018/0288809 A1 Oct. 4, 2018

Related U.S. Application Data

(60) Provisional application No. 62/477,958, filed on Mar. 28, 2017.

(51) Int. Cl.
*H04W 74/08* (2009.01)
*H04L 5/00* (2006.01)
*H04L 27/26* (2006.01)

(52) U.S. Cl.
CPC ....... *H04W 74/0833* (2013.01); *H04L 5/0053* (2013.01); *H04L 27/2613* (2013.01); *H04L 27/2675* (2013.01)

(58) Field of Classification Search
None
See application file for complete search history.

(56) References Cited

U.S. PATENT DOCUMENTS

| | | | |
|---|---|---|---|
| 4,754,493 A | 6/1988 | Coates | |
| 5,083,135 A | 1/1992 | Nagy et al. | |
| 5,182,642 A | 1/1993 | Gersdorff et al. | |
| 5,623,511 A | 4/1997 | Bar-David et al. | |

(Continued)

FOREIGN PATENT DOCUMENTS

| | | |
|---|---|---|
| CN | 1235720 A | 11/1999 |
| CN | 101682316 A | 3/2010 |

(Continued)

OTHER PUBLICATIONS

Office Action for U.S. Appl. No. 13/117,119, dated Aug. 5, 2013, 5 pages.

(Continued)

*Primary Examiner* — Lonnie V Sweet
(74) *Attorney, Agent, or Firm* — Perkins Coie LLP

(57) ABSTRACT

Methods, devices and systems for generating physical random access channel sequences that can be used to efficiently access a wireless network are disclosed. One exemplary method of accessing a wireless network includes generating a repeated orthogonal sequence by repeating a base orthogonal sequence, generating a random access sequence by applying a window function to the repeated orthogonal sequence, and accessing the wireless network using a random access procedure by selectively using the random access sequence. In an example, the base orthogonal sequence may be a Zadoff-Chu sequence. In another example, the window function may be a root-Hamming window.

19 Claims, 11 Drawing Sheets

(56) References Cited

U.S. PATENT DOCUMENTS

| | | |
|---|---|---|
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,010,048 B1 | 3/2006 | Shattil |
| 7,327,812 B2 | 2/2008 | Auer |
| 7,392,018 B1 | 6/2008 | Ebert et al. |
| 7,689,049 B2 | 3/2010 | Monro |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,717,210 B2 | 5/2014 | Eldar et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,668,148 B2 | 5/2017 | Hadani et al. |
| 9,712,354 B2 | 7/2017 | Hadani et al. |
| 9,729,281 B2 | 8/2017 | Hadani et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsket et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2005/0267746 A1* | 12/2005 | Jelinek .................. G10L 19/173 704/226 |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0040918 A1* | 2/2009 | Jiang .................. H04B 1/59 370/210 |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Rius et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0314664 A1* | 12/2012 | Johansson ......... H04W 74/0833 370/329 |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0321398 A1* | 10/2014 | Guo .................. H04W 74/0833 370/329 |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |

(56) References Cited

U.S. PATENT DOCUMENTS

| | | | |
|---|---|---|---|
| 2015/0359007 A1* | 12/2015 | Liu | H04L 5/0005 370/329 |
| 2015/0382231 A1 | 12/2015 | Jabbar et al. | |
| 2016/0043835 A1 | 2/2016 | Hadani et al. | |
| 2016/0135132 A1 | 5/2016 | Donepudi et al. | |
| 2016/0182269 A1 | 6/2016 | Hadani et al. | |
| 2016/0191217 A1 | 6/2016 | Hadani et al. | |
| 2016/0191280 A1 | 6/2016 | Hadani et al. | |
| 2016/0254889 A1 | 9/2016 | Shattil | |
| 2016/0277225 A1 | 9/2016 | Frenne et al. | |
| 2016/0309345 A1 | 10/2016 | Tehrani et al. | |
| 2016/0380743 A1 | 12/2016 | Rakib | |
| 2016/0381576 A1 | 12/2016 | Hadani et al. | |
| 2017/0012749 A1 | 1/2017 | Rakib et al. | |
| 2017/0012810 A1 | 1/2017 | Rakib et al. | |
| 2017/0019297 A1 | 1/2017 | Rakib | |
| 2017/0033899 A1 | 2/2017 | Rakib et al. | |
| 2017/0040711 A1 | 2/2017 | Rakib et al. | |
| 2017/0078054 A1 | 3/2017 | Hadani et al. | |
| 2017/0099122 A1 | 4/2017 | Hadani et al. | |
| 2017/0099607 A1 | 4/2017 | Hadani et al. | |
| 2017/0149594 A1 | 5/2017 | Rakib | |
| 2017/0149595 A1 | 5/2017 | Rakib et al. | |
| 2017/0201354 A1 | 7/2017 | Hadani et al. | |
| 2017/0207817 A1 | 7/2017 | Hadani et al. | |
| 2017/0222700 A1 | 8/2017 | Hadani et al. | |
| 2017/0230215 A1 | 8/2017 | Rakib et al. | |
| 2017/0244524 A1 | 8/2017 | Hadani et al. | |
| 2017/0295596 A1* | 10/2017 | Chen | H04L 27/2613 |
| 2019/0052486 A1* | 2/2019 | Kuchi | H04L 25/03834 |

FOREIGN PATENT DOCUMENTS

| | | |
|---|---|---|
| CN | 101939935 A | 1/2011 |
| EP | 1432168 A1 | 6/2004 |
| JP | 2011127910 | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |

OTHER PUBLICATIONS

Notice of Allowance for U.S. Appl. No. 13/117,119, dated Feb. 28, 2014, 13 pages.
Banelli, P. et al., "Modulation Formats and Waveforms for 5G Networks: Who Will Be the Heir of OFDM?," IEEE Signal Processing Magazine, vol. 81, pp. 80-93, Nov. 2014.
El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.
Rusek, F. et al., "Scaling Up MIMO, Opportunities and Challenges with Very Large Arrays," IEEE Signal Processing Magazine, pp. 40-60 (2013).
Vodafone, "Cellular Internet of Things: Architectural Aspects," RP-150869, 3GPP RAN#68, Malmo, Sweden (Jun. 9, 2015), 19 pages.
Supplementary European Search Report for European Application No. 11787483.4, dated Sep. 9, 2014, 6 pages.
International Search Report and Written Opinion for International Application No. PCT/US2011/038302, dated Nov. 15, 2011, 8 pages.
International Preliminary Report on Patentability for International Application No. PCT/US2011/038302, dated Dec. 4, 2012, 7 pages.
Office Action for U.S. Appl. No. 13/117,124, dated Feb. 22, 2013, 7 pages.
Notice of Allowance for U.S. Appl. No. 13/117,124, dated Aug. 8, 2013, 10 pages.
Office Action for U.S. Appl. No. 14/605,957, dated Jun. 22, 2017, 6 pages.
Supplementary European Search Report for European Application No. 13809004.8, dated Apr. 14, 2016, 8 pages.
Communication Pursuant to Article 94(3) EPC for European Application No. 13809004.8, dated Feb. 17, 2017, 5 pages.
Notice of Allowance for U.S. Appl. No. 13/927,087, dated Feb. 25, 2015, 9 pages.
Office Action for U.S. Appl. No. 13/927,087, dated Nov. 12, 2014, 14 pages.
Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).
International Search Report and Written Opinion for International Application No. PCT/US2013/047723, dated Oct. 29, 2013, 17 pages.
International Preliminary Report on Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network_html>, 5 pages.
Catt, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Rep-

(56) References Cited

OTHER PUBLICATIONS resentation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.
International Search Report and Written Opinion for International Application No. PCT/US2017/025797, dated Jun. 21, 2017, 6 pages.
International Search Report and Written Opinion for International Application No. PCT/US2016/030259, dated Aug. 4, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.

* cited by examiner

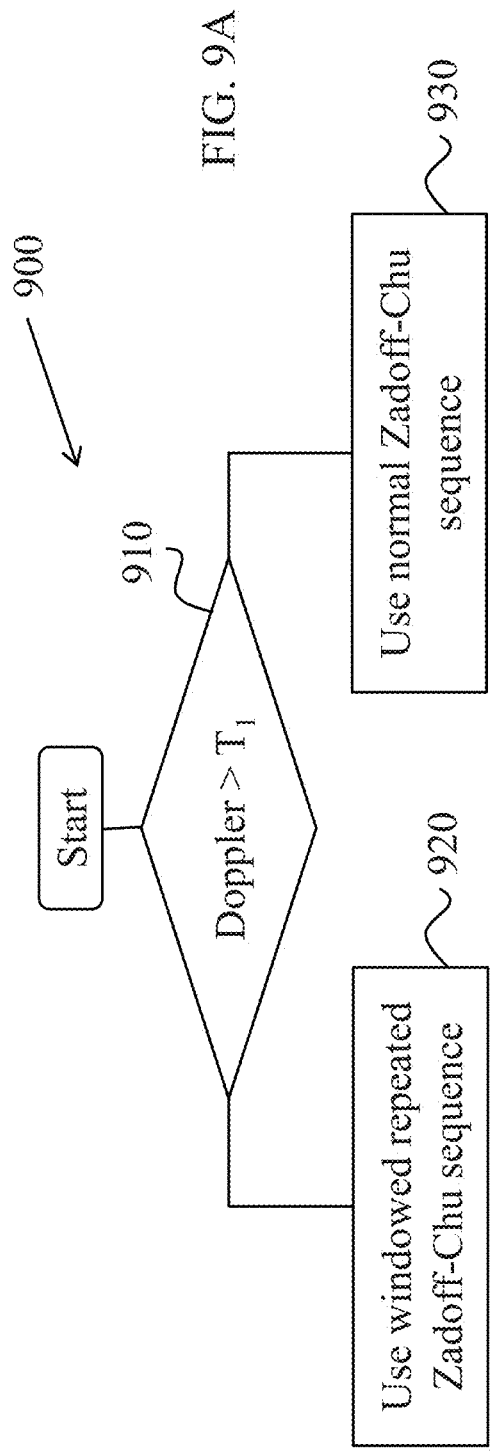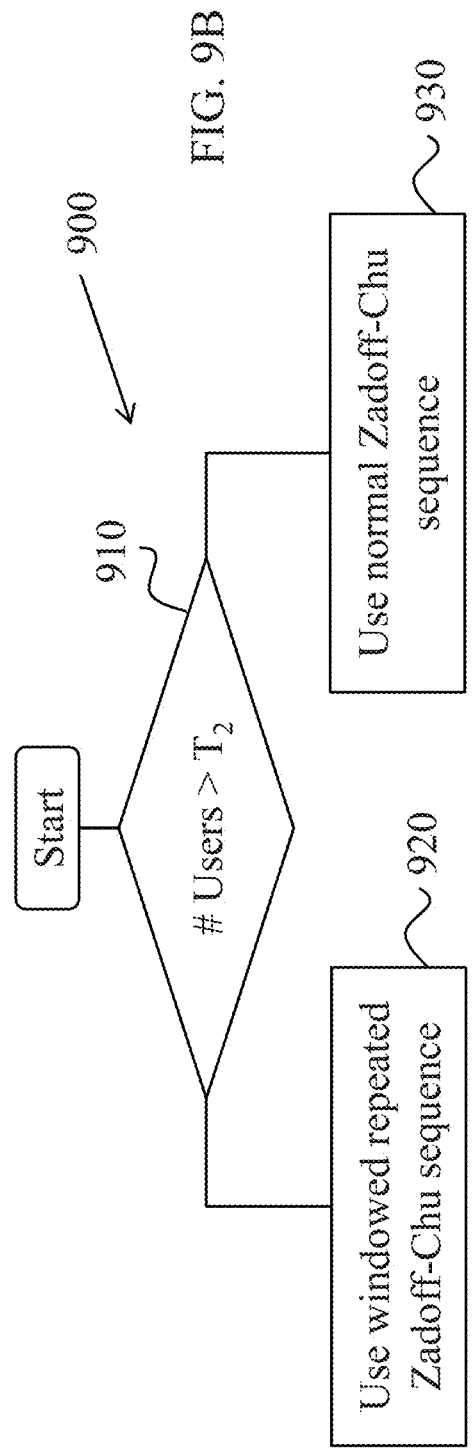

WINDOWED SEQUENCE FOR RANDOM ACCESS METHOD AND APPARATUS

CROSS REFERENCE TO RELATED APPLICATIONS

This patent document claims the benefit of priority of U.S. Provisional Patent Application No. 62/477,958 entitled "WINDOWED SEQUENCE FOR RANDOM ACCESS CHANNEL" and filed on 28 Mar. 2017. The entire content of the before-mentioned patent application is incorporated by reference in this patent document.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses physical random access channel (PRACH) sequences that can be used to efficiently access a wireless network.

In one exemplary aspect, a method for accessing a wireless network is disclosed. The method includes generating a repeated orthogonal sequence by repeating a base orthogonal sequence, generating a random access sequence by applying a window function to the repeated orthogonal sequence, and accessing the wireless network using a random access procedure by selectively using the random access sequence.

In another exemplary aspect, a method of wireless signal reception over a RACH is disclosed. The method includes selectively receiving a random access sequence, which is generated by windowing a repeated orthogonal sequence, which itself is generated by repeating a base orthogonal sequence, identifying a user device by correlating the received random access sequence with a plurality of access sequences, and receiving the transmission from the identified user device over the random access channel.

In yet another exemplary aspect, the above-described methods are embodied in the form of processor-executable code and stored in a computer-readable program medium.

In yet another exemplary aspect, a device that is configured or operable to perform the above-described methods is disclosed.

The above and other aspects and their implementations are described in greater detail in the drawings, the descriptions, and the claims.

BRIEF DESCRIPTION OF THE DRAWINGS

Drawings described herein are used to provide a further understanding and constitute a part of this application. Example embodiments and illustrations thereof are used to explain the technology rather than limit its scope.

FIGS. 9A and 9B show flowcharts of example methods for conditionally using a windowed sequence for random access.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document to improve readability of the description and do not in any way limit the discussion to the respective sections only.

Wireless devices often use orthogonal sequences for initial access to a wireless network using a random access procedure of some kind. These orthogonal sequences have the mathematical property that cyclic shifts of the orthogonal sequences are orthogonal with each other. The Zadoff-Chu sequence is an example of one such orthogonal sequence.

The traditional Zadoff-Chu sequence is, however, susceptible to Doppler shifts caused by moving user devices. This entails inefficient use of the wireless transmission resources.

The windowed orthogonal sequences disclosed in the present document can be used to, among other uses, improve robustness against such Doppler shifts.

Figure 1:
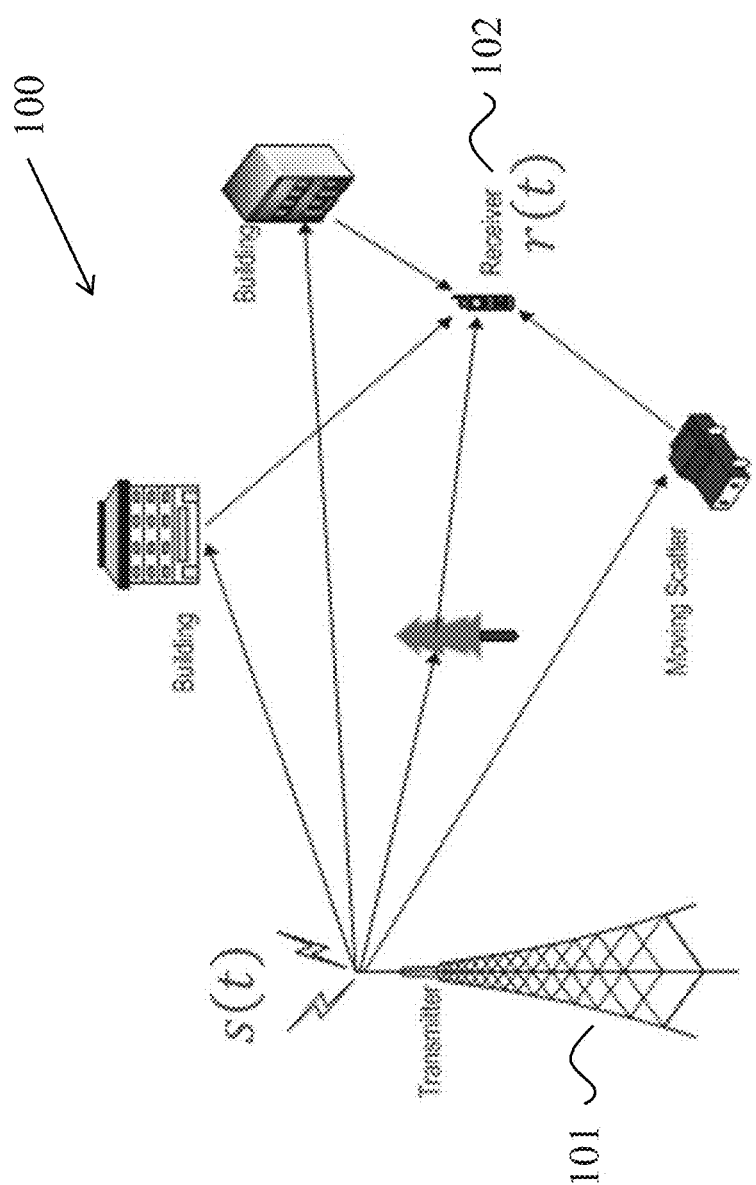
FIG. 1 shows an example communication network.

FIG. 1 shows an example communication network 100 in which the disclosed technologies can be implemented. The network 100 may include a base station transmitter 101 that transmits wireless signals s(t) (downlink signals) to one or more receivers 102, the received signal being denoted as r(t), which may be located in a variety of locations, including inside or outside a building and in a moving vehicle. The receivers may transmit uplink transmissions to the base station, typically located near the wireless transmitter. The technology described herein may be implemented at a receiver 102 or at the transmitter (e.g., a base station or hub).

In some embodiments, the one or more receivers 102 may join the network over a physical random access channel (PRACH) by transmitting a random circular shift of a fixed Zadoff-Chu (ZC) sequence. The base station 101 may correlate the received signal with fixed C sequences, and looks for peaks in the correlation. The peaks may be used to range the users and assign IDs to the users. In other embodiments, other similar synchronization sequences may be used to join the network over the PRACH.

Figure 2:
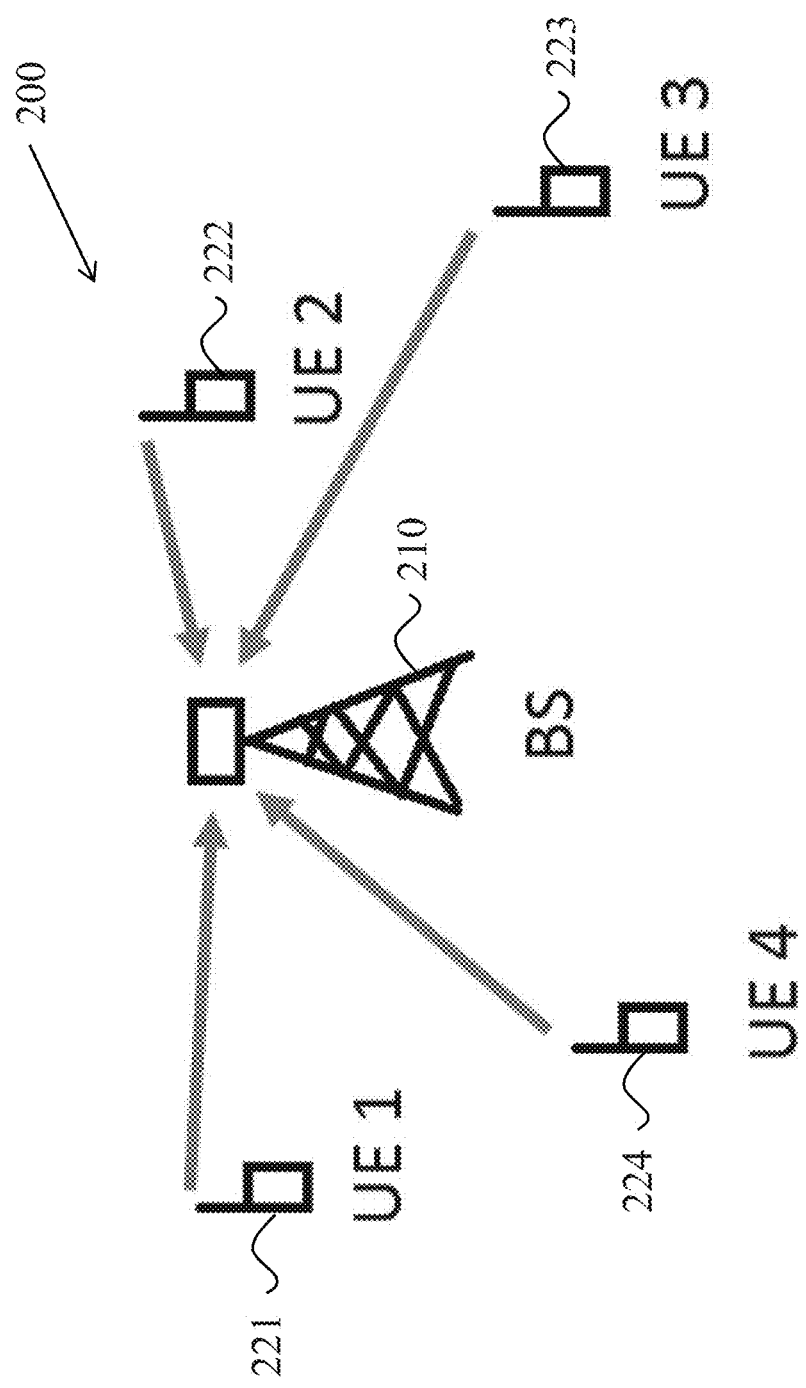
FIG. 2 shows another example communication network.

FIG. 2 shows another example communication network 200 that shows a wireless cell that consists of a single base station (BS, 210) radio servicing a number of spatially distributed user radios (UEs, 221 through 224). The process of the UEs joining the network is called the random-access procedure. The procedure works by each user seeking to join the network transmitting a random circular shift of a fixed Zadoff-Chu sequence. The hub correlates the received signal with the fixed Zadoff-Chu sequence and looks for peaks. The peaks are used to range the users and assign IDs.

Overview of Zadoff-Chu Sequences

Zadoff-Chu (ZC) sequences are defined by the equation:

$$ZC(n) = \exp\left(-j\frac{\pi\alpha n(n+1)}{N}\right), \text{ for } 0 \leq n \leq N,$$

where N denotes the total number of samples, and $\alpha$ denotes the Zadoff-Chu root index. ZC sequences exhibit the useful property that cyclically shifted versions of themselves are orthogonal to one another, provided, that is, that each cyclic shift, when viewed within the time domain of the signal, is greater than the combined propagation delay and multi-path delay-spread of that signal between the transmitter and receiver.

In the context of PRACH, this property enables a base station to separate different users when their signals are received, since cyclically shifted ZC sequences transmitted by the different users are uncorrelated with each other. However, the presence of Doppler destroys the perfect autocorrelation property of ZC sequences.

Figure 3:
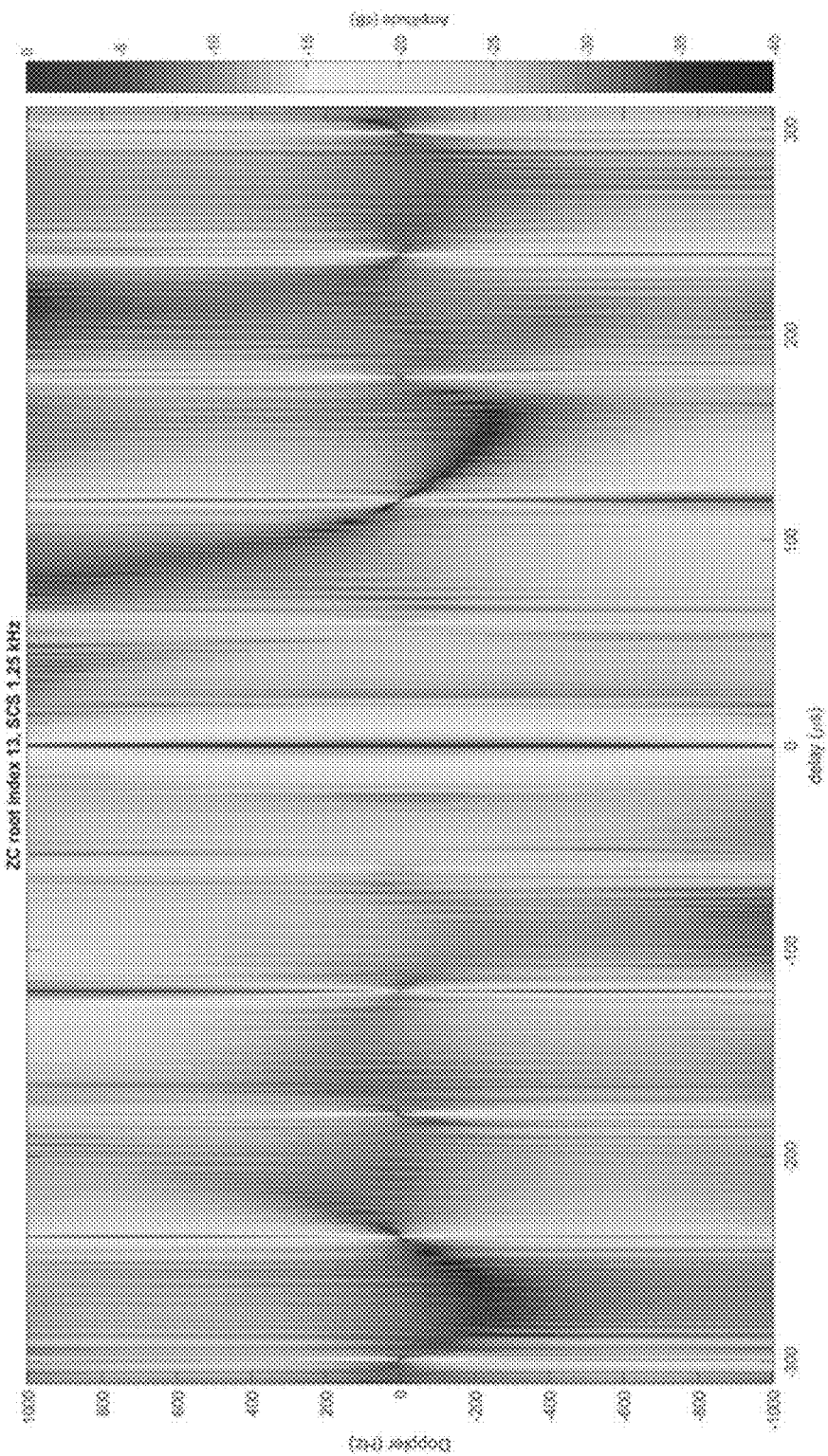
FIG. 3 shows an example of an ambiguity function of a Zadoff-Chu sequence.

FIG. 3 shows an example of a radar ambiguity function of a Zadoff-Chu sequence, which is the output of correlating the ZC sequence with its delay and Doppler shifts. As shown in FIG. 3, certain delay and Doppler shifts of the ZC sequence can yield a very strong correlation with the original ZC sequence. For PRACH usage, this implies that if the channel experiences Doppler, then ZC sequences transmitted by some subset of the different users are correlated with each other, and therefore cannot be separated when received at the base station.

Examples of Windowed Repetition Zadoff-Chu Sequences

In order to overcome this susceptibility to channel Doppler, the Zadoff-Chu sequences may be repeated and windowed, as described in the various embodiments of the disclosed technology.

Figures 4A, 4B:
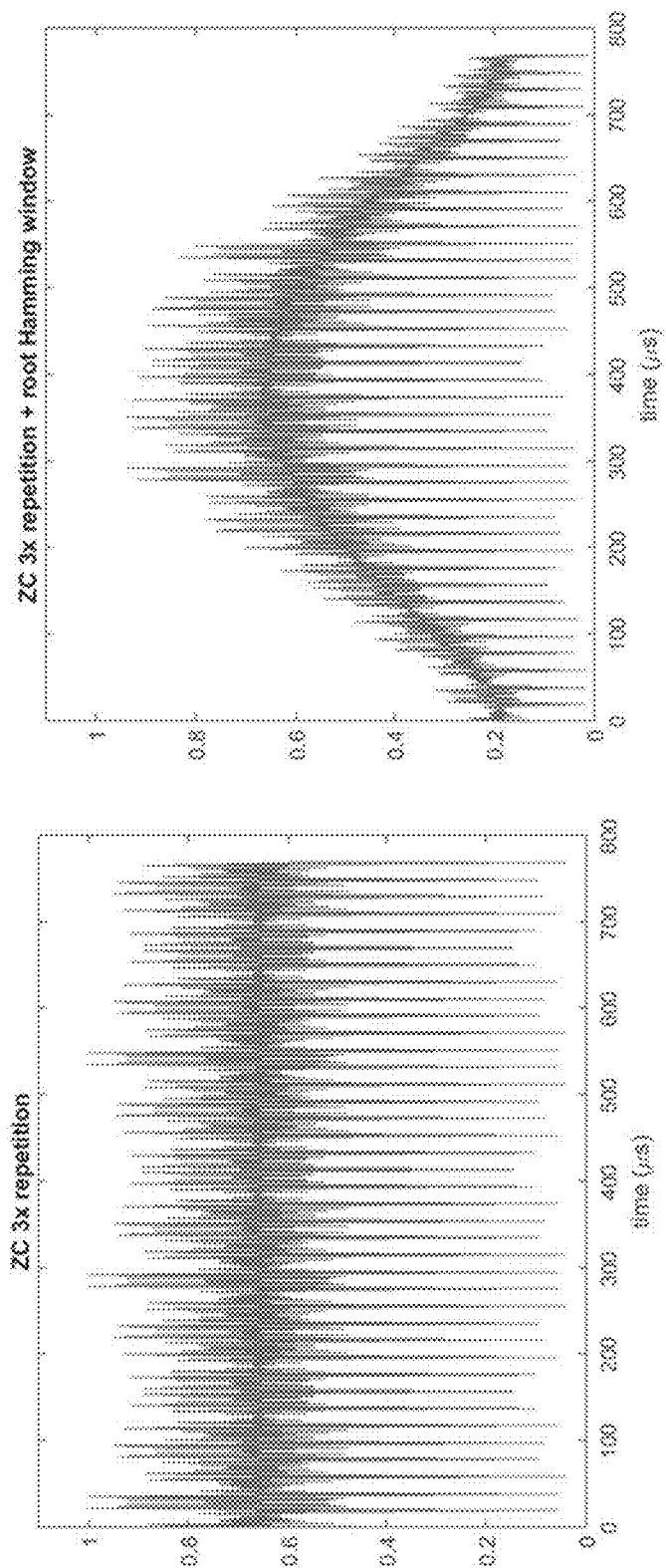
FIGS. 4A and 4B show an exemplary times-series for a repeated Zadoff-Chu sequence and a windowed repeated Zadoff-Chu sequence, respectively.
Figure 5:
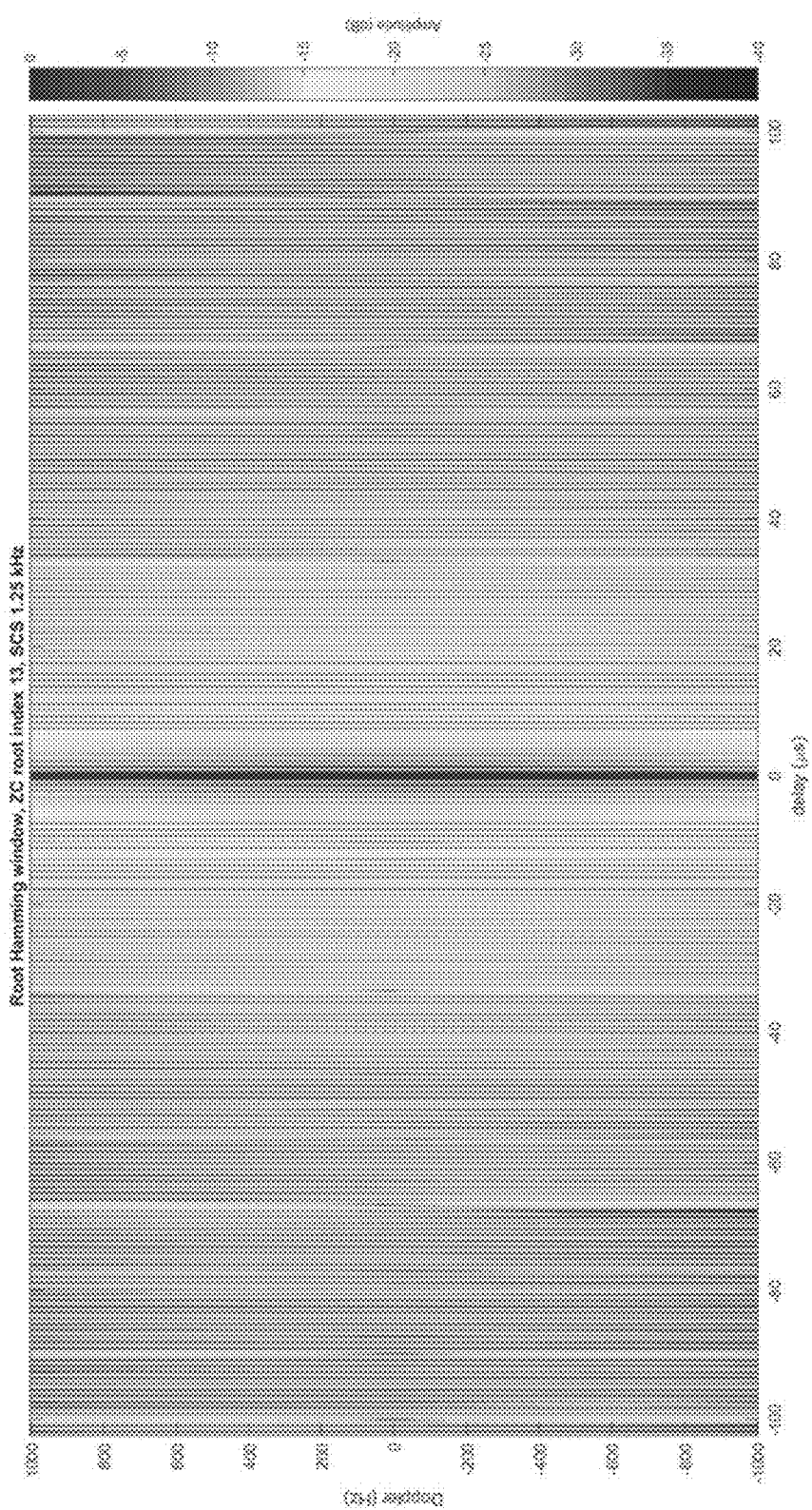
FIG. 5 shows an example of an ambiguity function of a windowed repeated Zadoff-Chu sequence.

In some embodiments, the ZC sequence may be repeated three times, as shown in the time-series in FIG. 4A, and may then be windowed using a root Hamming window (in the time domain) that results in the time-series shown in FIG. 4B. The repetition and windowing of the ZC sequence renders the resulting sequence robust to Doppler, as is indicated in the example radar ambiguity function shown in FIG. 5. A shown therein, there is a very strong correlation at a delay of 0 μs and a relatively weak correlation for all other delay values, across all Doppler values. In the context of PRACH usage, this is beneficial since the windowed repeated sequences transmitted by the different users are uncorrelated with each other, and can be separated when received at the base station.

In other embodiments, other windows may be used in lieu of the root Hamming window described in the example above. For example, any one of the Hann, Blackman, Nuttall, Blackman-Harris, Blackman-Nuttall or flat-top windows may be used. In other examples, the square root of any of these windows may be used. Similarly, other embodiments may use other orthogonal sequences. The disclosed technology covers any feasible combination of orthogonal sequence, window and repetition factor, as described in the various embodiments herein.

In an example, let N denote the length of a baseband ZC sequence. Then M=KN is the length of a final sequence, where K is a repetition factor (in the example described above in the context of FIGS. 4A, 4B and 5, K=3). The final sequence, which may be transmitted by a user, is denoted as p, and given by:

$$p[m] = w_r[m]ZC[\mathrm{mod}(m,N)], \text{ for } m=0,1,\ldots,M-1$$

where $w_r$ denoted the root-Hamming window, and ZC denotes a Zadoff-Chu sequence, and which are defined as:

$$w_r[m] = \sqrt{0.54 - 0.46 \cos(2\pi m/(M-1))} \text{ for } m = 0, 1, \ldots, M-1$$

$$ZC[m] = \exp\left(-j\frac{\pi\alpha n(n+1)}{N}\right) \text{ for } n = 0, 1, \ldots, N-1$$

where $\alpha$ denotes the root index of the Zadoff-Chu sequence.

Examples of Experimental Results

The performance of root Hamming windowed repetition ZC sequences may be compared to standard ZC sequences. In an example, the following table summarizes the simulation parameters used for the comparison.

TABLE 1

| Simulation parameters for comparison of root Hamming windowed repetition ZC sequences | |
|---|---|
| Channel model | CDL-C (NLOS clustered delay line) |
| User speed | 120 km/h |
| Carrier frequency | 4 GHz |
| Bandwidth | 1.08 MHz |
| Timing offset | 0-10 microseconds |
| Carrier offset | 0.1 ppm at UE 0.05 ppm at base station |
| MIMO order | 1 × 1 |

Figure 6:
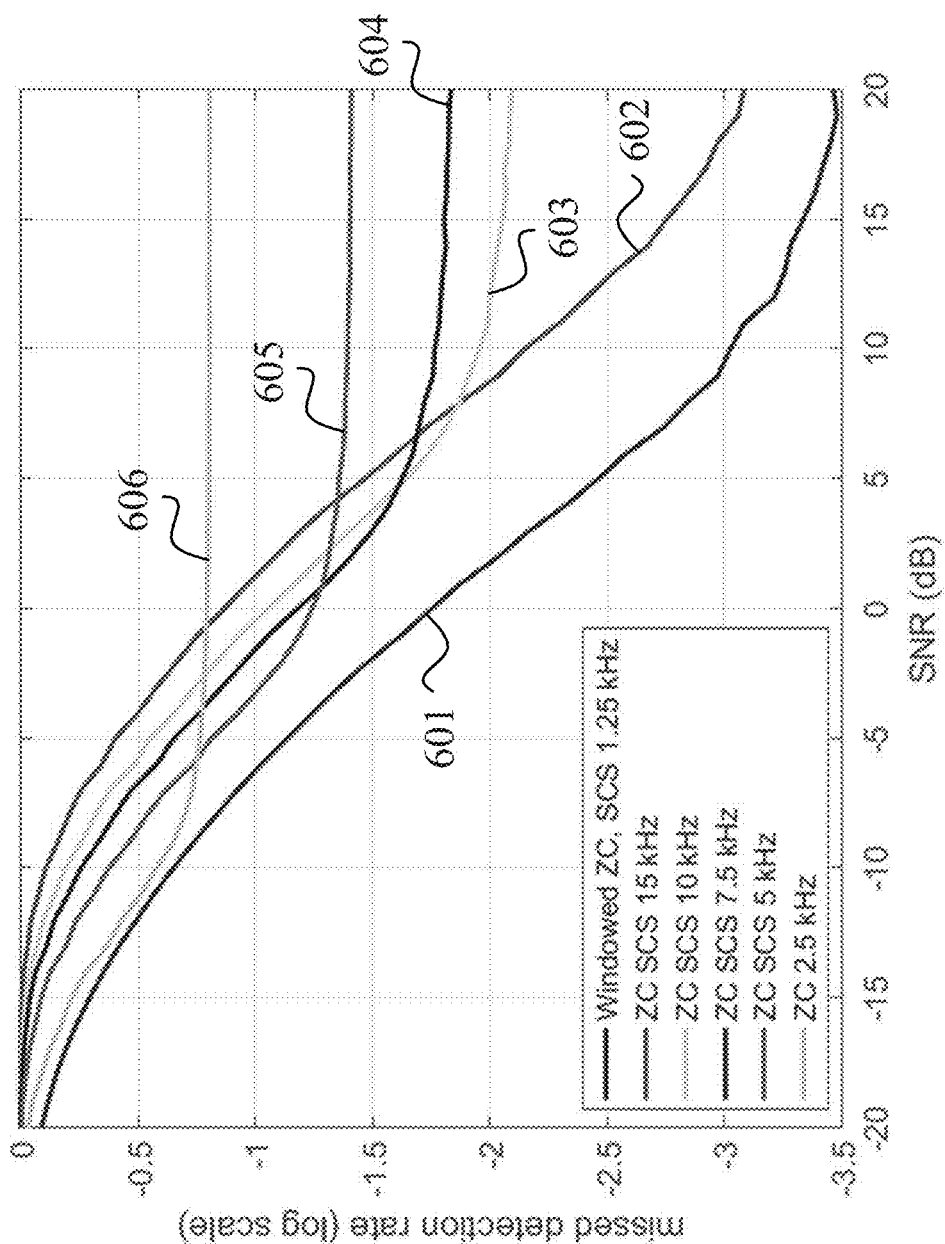
FIG. 6 shows missed detection probabilities for exemplary RACH sequences.

FIG. 6 shows the missed detection rate as a function of the SNR for the windowed repeated ZC sequence with a sub-carrier spacing (SCS) of 1.25 kHz (plotted line 601) as compared to ZC sequences with subcarrier spacings of 15 kHz, 10 kHz, 7.5 kHz, 5 kHz and 2.5 kHz (plotted lines 602, 603, 604, 605 and 606, respectively). For the results shown in FIG. 6, a missed detection occurs if the PRACH sequence is not detected, if an incorrect PRACH sequence is detected, or if an error is made in computing the timing offset.

Exemplary Embodiments of the Disclosed Technology

Figure 7:
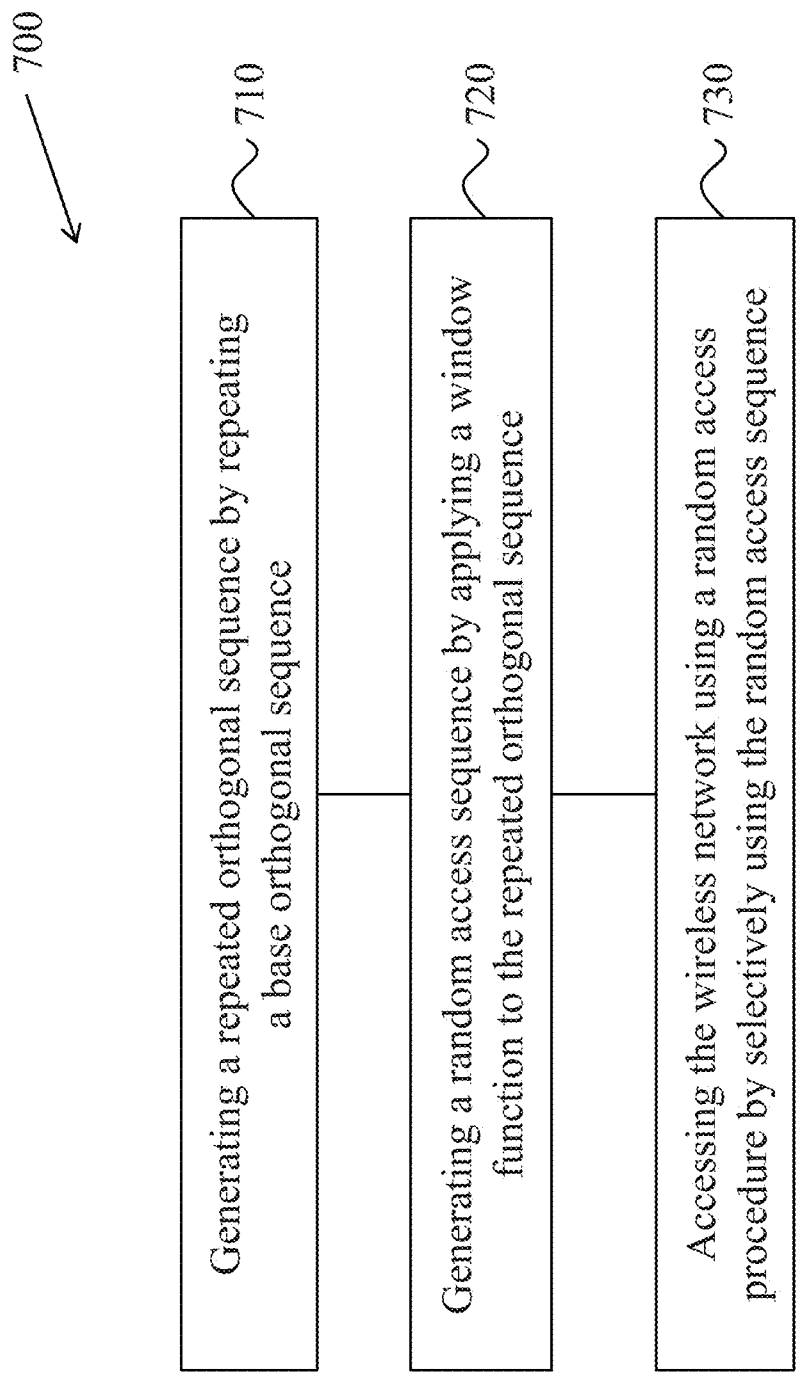
FIG. 7 shows a flowchart of an example method, implemented at a user device, for using a windowed sequence for random access.

FIG. 7 shows a flowchart of an example method 700, implemented at a user device, for accessing a wireless network. For example, the method 700 may be used for generating and using a windowed sequence for random access. The method 700 includes, at step 710, generating a repeated orthogonal sequence by repeating a base orthogonal sequence. In some embodiments, the base orthogonal sequence may be the Zadoff-Chu (ZC) sequence. For example, the method may further include selecting a root index ($\alpha$) and length (L) for the ZC sequence, and a repetition factor (N), which are used to generate the repeated orthogonal sequence.

The method 700 includes, at step 720, generating a random access sequence by applying a window function to the repeated orthogonal sequence. In some embodiments, the window function may be based on a Hamming window. In an example, the base orthogonal sequence may be repeated N=3 times and a root-Hamming window may be used to generate the random access sequence. In other embodiments, a function of any existing or defined windows may be used to window the repeated orthogonal sequence. In an example, the window may be one of the Hann, Blackman, Nuttall, Blackman-Harris, Blackman-Nuttall or flat-top windows.

The method 700 includes, at step 730, accessing the wireless network using a random access procedure by selectively using the random access sequence. In some embodiments, the method may further include mapping the random access sequence onto a number K of time-frequency resources. In an example, the time-frequency resources may be part of the physical random access channel (PRACH), and the mapping may comprise selecting OFDM subcarriers to which the symbols of the random access sequence are assigned.

The user device performing the method 700 may access the network using the above-described (windowed) random access sequence under certain network operational conditions, such as when the Doppler speed of a user device is above a threshold. Another example of the operational network condition may be density of user devices in a given network area (e.g., one cell of coverage). In the former case, the threshold may be, for example, 50 to 70% of the maximum Doppler shift, while in the latter case, the threshold may be a number between 50 to 70% of a base station's capacity in the geographic region. When such network operational conditions are absent, then a non-windowed orthogonal sequence may be used. The non-windowed orthogonal sequence may, for example, include a rectangular window function that applies uniformly equal weight to each coefficient of the repeated orthogonal sequence.

Figure 8:
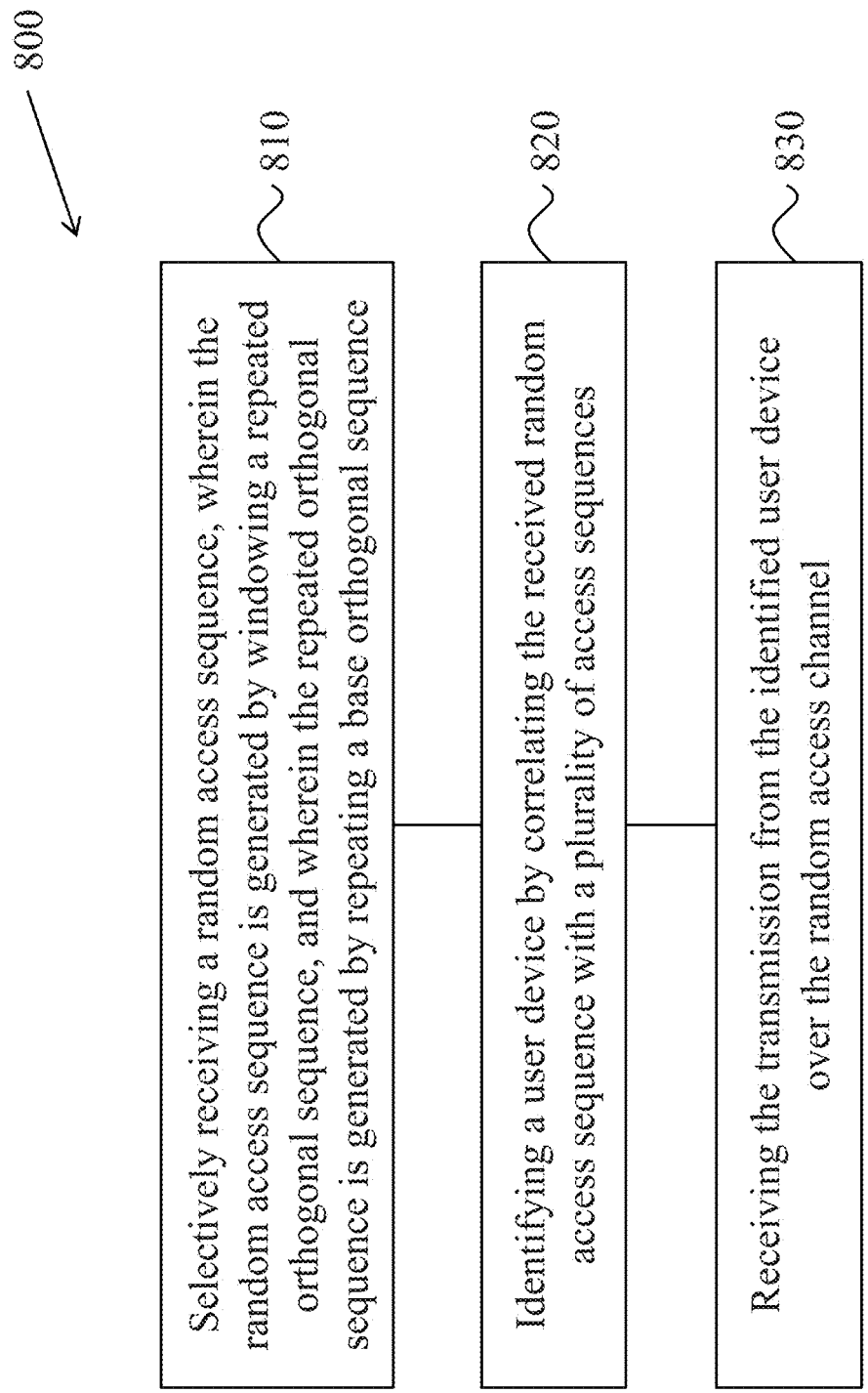
FIG. 8 shows a flowchart of an example method, implemented at a network node, for using a windowed sequence for random access.

FIG. 8 shows a flowchart of an example method 800, implemented at a network node, for using a windowed sequence for random access. The method 800 includes, at step 810, selectively receiving a random access sequence, wherein the random access sequence is generated by windowing a repeated orthogonal sequence, and wherein the repeated orthogonal sequence is generated by repeating a base orthogonal sequence. In some embodiments, the base orthogonal sequence may be the Zadoff-Chu (ZC) sequence, which may be repeated N times. In some embodiments, the windowing may be based on a Hamming window. In other embodiments, a function of any existing or defined windows may be used for the windowing. In an example, the windowing may be based on one of Hann, Blackman, Nuttall, Blackman-Harris, Blackman-Nuttall or flat-top windows, or their square-roots.

The method 800 includes, at step 820, identifying a user device by correlating the received random access sequence with a plurality of access sequences. In some embodiments, the received random access sequence may be a ZC sequence, which is correlated with different cyclic shifts of the ZC sequence. As described in the context of FIGS. 5 and 6, the windowed repeated version of the base orthogonal sequence will yield a high correlation output with the reference ZC sequence with the correct cyclic shift, and will be minimally affected by Doppler.

The method 800 includes, at step 830, receiving the transmission from the identified user device over the random access channel. In some embodiments, the method may further include receiving a transmission that has a ZC sequence (or a windowed repeated ZC sequence) as part of the preamble of the transmission. This will enable this and subsequent transmissions to be acquired in the presence of Doppler variations on the channel.

In methods 700 and 800, the repetition number N may be a pre-determined, fixed number. Alternatively, in some embodiments, the number N may be changed in the wireless network from time to time, and communicated from the base station to the user devices via a higher layer message. The threshold used in the method 800 may be similar to as described with respect to the method 700.

FIGS. 9A and 9B show flowcharts of example methods for conditionally using a windowed sequence for random access. As shown in FIG. 9A, the method 900 includes, at step 910, comparing the channel Doppler to a threshold, and subsequently selectively using either the random access sequence or a non-windowed orthogonal sequence. At step 920, if the Doppler is greater than the threshold, the windowed repeated base orthogonal sequence (or ZC sequence) is used. In contrast, at step 930, if the Doppler does not exceed the threshold, the non-windowed orthogonal sequence may be used.

Similarly, and as shown in FIG. 9B, the method 900 includes comparing the number of users (for example, in a cell/sector/area) to a threshold. At step 920, when the number of users exceeds the threshold, the windowed repeated base orthogonal sequence (or ZC sequence) is used. In contrast, at step 930, if the number of users is less than or equal to the threshold, the non-windowed orthogonal sequence may be used. In some embodiments, and applicable to the methods in both FIGS. 9A and 9B, the thresholds may be communicated to the user device via an upper level message from the network node. In other embodiments, the method 900 may be used in conjunction with methods 700 and 800, as described above. In yet other embodiments, the wireless device may selectively choose to (or not use) the windowed orthogonal function based on the combination of one or more of a first threshold—a first threshold that is indicative of the speed of a user device that is attempting to join the wireless network and a second threshold indicative of a number of user devices in a given network region—e.g., a cell, or a sector.

Figure 10:
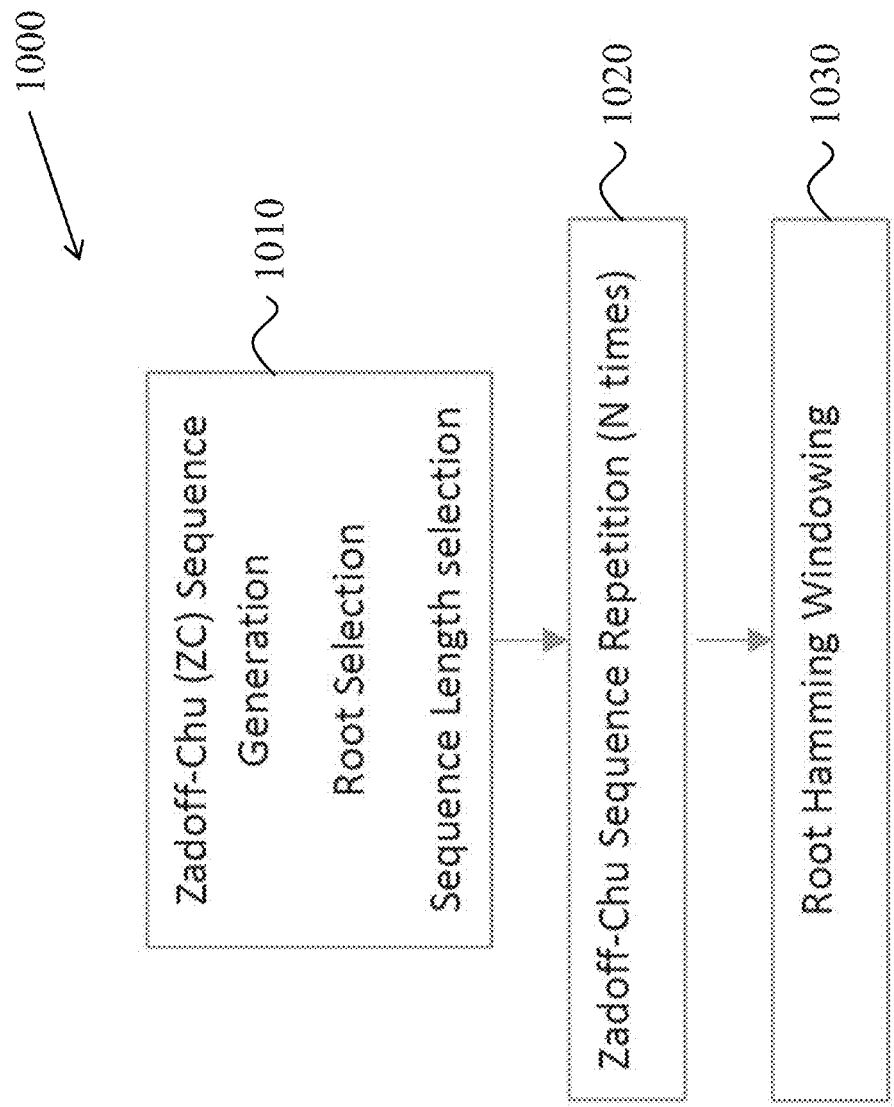
FIG. 10 shows a flowchart of another example method, implemented at a wireless device (or user equipment), for using a windowed sequence for random access.

FIG. 10 shows a flowchart of another example method 1000, implemented at a user device, for using a windowed sequence for random access. In some embodiments, the method 1000 may be implemented by an apparatus in a mobile communications systems attempting to access the system and competing with other user devices to get access to a given channel. The apparatus may generate a Zadoff-Chu sequence of length L and of root R (1010), and the sequence may be repeated a number N times (1020) and the repeated Zadoff-Chu sequence may be the input of a root-hamming window (1030) and the output is transmitted via the physical random access channel (PRACH) and mapped onto a number K of resources. Thus, an exemplary apparatus (or wireless device) performs the method as depicted in FIG. 10. In some embodiments, the method in FIG. 10 may include mapping resources, which may comprise the sequence described above being mapped onto OFDM subcarriers.

Figure 11:
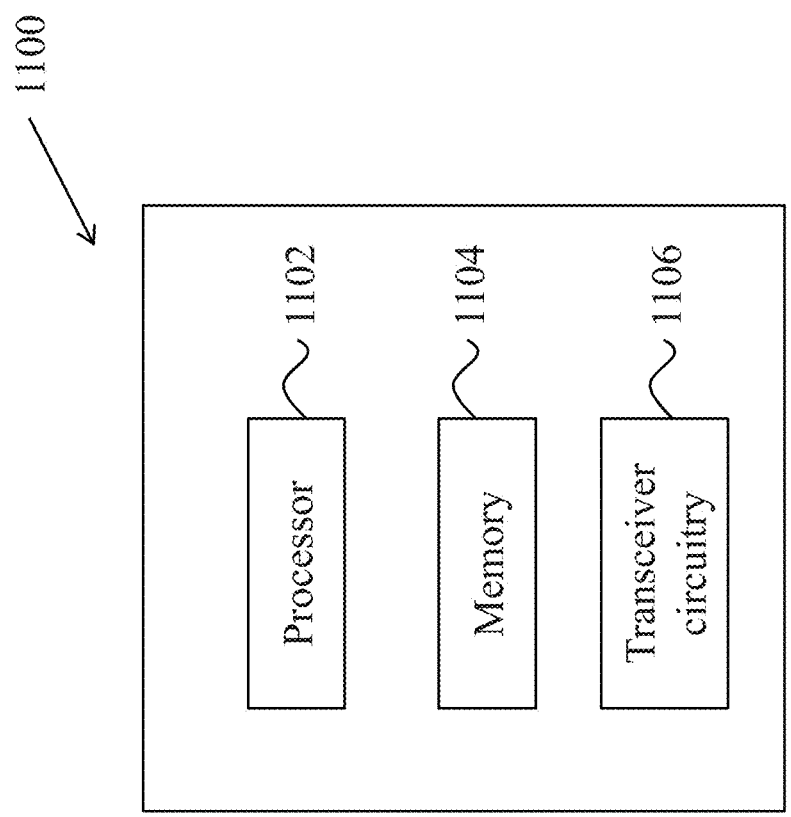
FIG. 11 is a block diagram representation of a portion of an apparatus that may implement a method or technique described in this patent document.

FIG. 11 shows an example of a wireless transceiver apparatus 1100. The apparatus 1100 may be used to implement any method (e.g. methods 700, 800, 900 and 1000) or technique described in this document. The apparatus 1100 includes a processor 1102, a memory 1104 that stores processor-executable instructions and data during computations performed by the processor. The apparatus 1100 includes reception and/or transmission circuitry 1106, e.g., including radio frequency operations for receiving or transmitting signal and/or receiving data or information bits for transmission over a wireless network.

It will be appreciated that the disclosed techniques are useful in wireless communication by providing PRACH preamble sequences that use a windowed repeated orthogonal sequence.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of accessing a wireless network, comprising:
generating a repeated orthogonal sequence by repeating a base orthogonal sequence;
generating a random access sequence by applying a square-root Hamming window function to the repeated orthogonal sequence upon a determination that a network condition metric is greater than a threshold and by applying a rectangular window function to the repeated orthogonal sequence upon a determination that the network condition metric is less than or equal to the threshold; and
accessing the wireless network using a random access procedure by selectively using the random access sequence.

2. The method of claim 1, wherein the repeated orthogonal sequence is generated by repeating the base orthogonal sequence N times, and wherein N is an integer.

3. The method of claim 1, wherein the base orthogonal sequence comprises a Zadoff-Chu sequence.

4. The method of claim 1, wherein the base orthogonal sequence comprises a Zadoff-Chu sequence and is repeated three times.

5. The method of claim 1, wherein the network condition metric is a Doppler speed of the user device.

6. The method of claim 1, wherein the network condition metric is a number of user devices in a given network division.

7. A method of receiving a transmission over a random access channel in a wireless communication system, comprising:

selectively receiving a random access sequence, wherein the random access sequence is generated by windowing a repeated orthogonal sequence using a square-root Hamming window upon a determination that a network condition metric is greater than a threshold and by windowing the repeated orthogonal sequence using a rectangular window upon a determination that the network condition metric is less than or equal to the threshold, and wherein the repeated orthogonal sequence is generated by repeating a base orthogonal sequence;

identifying a user device by correlating the received random access sequence with a plurality of access sequences; and receiving the transmission from the identified user device over the random access channel.

8. The method of claim 7, wherein the repeated orthogonal sequence is generated by repeating the base orthogonal sequence N times, and wherein N is an integer.

9. The method of claim 7, wherein the base orthogonal sequence comprises a Zadoff-Chu sequence.

10. The method of claim 7, wherein the base orthogonal sequence comprises a Zadoff-Chu sequence and is repeated three times.

11. The method of claim 7, wherein the network condition metric is a Doppler speed of the user device.

12. The method of claim 7, wherein the network condition metric is a number of user devices in a given network division.

13. A wireless communication apparatus comprising a processor programmed to implement a method of accessing a wireless network, the method comprising:

generating a repeated orthogonal sequence by repeating a base orthogonal sequence;

generating a random access sequence by applying a square-root Hamming window function to the repeated orthogonal sequence upon a determination that a network condition metric is greater than a threshold and by applying a rectangular window function to the repeated orthogonal sequence upon a determination that the network condition metric is less than or equal to the threshold; and accessing the wireless network using a random access procedure by selectively using the random access sequence.

14. The wireless communication apparatus of claim 13, wherein the repeated orthogonal sequence is generated by repeating the base orthogonal sequence N times, and wherein N is an integer.

15. The wireless communication apparatus if claim 13, wherein the base orthogonal sequence comprises a Zadoff-Chu sequence.

16. A wireless communication apparatus, comprising a processor programmed to implement a method of receiving a transmission over a random access channel, the method comprising:

selectively receiving a random access sequence, wherein the random access sequence is generated by windowing a repeated orthogonal sequence using a square-root Hamming window upon a determination that a network condition metric is greater than a threshold and by windowing the repeated orthogonal sequence using a rectangular window upon a determination that the network condition metric is less than or equal to the threshold, and wherein the repeated orthogonal sequence is generated by repeating a base orthogonal sequence;

identifying a user device by correlating the received random access sequence with a plurality of access sequences; and receiving the transmission from the identified user device over the random access channel.

17. The wireless communication apparatus of claim 16, wherein the base orthogonal sequence comprises a Zadoff-Chu sequence.

18. The wireless communication apparatus of claim 16, wherein the network condition metric is a number of user devices in a given network division.

19. The wireless communication apparatus of claim 16, wherein the network condition metric is a Doppler speed of the user device.

* * * * *

UNITED STATES PATENT AND TRADEMARK OFFICE
CERTIFICATE OF CORRECTION

PATENT NO. : 10,568,143 B2
APPLICATION NO. : 15/937701
DATED : February 18, 2020
INVENTOR(S) : James Delfeld, Ronny Hadani and Konstantinos Dimou Page 1 of 1

It is certified that error appears in the above-identified patent and that said Letters Patent is hereby corrected as shown below:

In the Specification

On Column 3, Line 21, delete "a" and insert --α--

In the Claims

On Column 10, Line 11, delete "if" and insert --of--

Signed and Sealed this
Ninth Day of February, 2021

Drew Hirshfeld
*Performing the Functions and Duties of the
Under Secretary of Commerce for Intellectual Property and
Director of the United States Patent and Trademark Office*